(12) United States Patent
Grainger et al.

(10) Patent No.: US 7,122,507 B2
(45) Date of Patent: *Oct. 17, 2006

(54) DRILLING FLUIDS AND METHOD OF DRILLING

(75) Inventors: Neil Grainger, Stockton on Tees (GB); Terence Cox, Saltburn by Sea (GB); Edward George Scovell, Middlesbrough (GB)

(73) Assignee: Imperial Chemical Industries PLC, London (GB)

(*) Notice: Subject to any disclaimer, the term of this patent is extended or adjusted under 35 U.S.C. 154(b) by 180 days.

This patent is subject to a terminal disclaimer.

(21) Appl. No.: 10/293,614

(22) Filed: Nov. 14, 2002

(65) Prior Publication Data

US 2003/0130132 A1 Jul. 10, 2003

Related U.S. Application Data

(63) Continuation of application No. PCT/GB01/02057, filed on May 10, 2001.
(60) Provisional application No. 60/205,032, filed on May 18, 2000.

(30) Foreign Application Priority Data

May 15, 2000 (GB) ............................................. 0011584

(51) Int. Cl.
*C09K 7/06* (2006.01)

(52) U.S. Cl. ........................ 507/137; 507/136; 507/138; 516/21

(58) Field of Classification Search ................. 507/137, 507/136, 138, 262, 263, 267, 925; 516/21
See application file for complete search history.

(56) References Cited

U.S. PATENT DOCUMENTS

| | | | | | |
|---|---|---|---|---|---|
| 3,083,158 | A | * | 3/1963 | Markham | 507/203 |
| 3,415,320 | A | * | 12/1968 | Young | 166/294 |
| 3,810,836 | A | * | 5/1974 | Norton | 507/116 |
| 4,556,495 | A | * | 12/1985 | Shaw | 507/263 |
| 4,664,820 | A | * | 5/1987 | Magauran et al. | 508/136 |
| 4,781,207 | A | * | 11/1988 | Balzer | 137/13 |
| 4,844,756 | A | | 7/1989 | Forsberg | |
| 5,633,220 | A | | 5/1997 | Cawiezel et al. | |
| 5,710,111 | A | * | 1/1998 | Van Slyke | 507/137 |
| 5,925,182 | A | | 7/1999 | Patel et al. | |
| 2003/0060375 | A1 | * | 3/2003 | Grainger et al. | 507/200 |

FOREIGN PATENT DOCUMENTS

| | | |
|---|---|---|
| EP | 0374672 A1 | 6/1990 |
| WO | WO 93/23491 | 11/1993 |

* cited by examiner

*Primary Examiner*—Philip C. Tucker
(74) *Attorney, Agent, or Firm*—Mayer, Brown, Rowe & Maw, LLP

(57) ABSTRACT

Drilling, completing or workover of a well, particularly an oil and/or gas well, is carried out using a fluid which includes a continuous phase including an ester of the formula (I): $(R^2)_p\text{-Ph-}(CH_2)_m\text{—COO-}(AO)_n\text{-}R^1$ where $R^1$, AO, n, m, Ph, $R^2$ and p have defined meanings and particularly where the esters are alkyl or alkenyl benzoate esters. These esters are beneficial by having a range of viscosities, especially extending to low viscosities, and attractive toxicological and environmental profiles for use in drilling, completion and/or workover of wells.

35 Claims, No Drawings

DRILLING FLUIDS AND METHOD OF DRILLING

CROSS REFERENCE TO RELATED APPLICATIONS

This application is a continuation of International Application No. PCT/GB01/02057, filed May 10, 2001, and further claims benefit from U.S. Provisional Application No. 60/205,032, filed May 18, 2000. These applications, in their entirety, are incorporated herein by reference.

This invention relates to drilling, completion and workover operations on wells, particularly oil and gas wells, which use fluids based on hydrocarbyl, especially alkyl or alkenyl, esters of certain aromatic carboxylic acids, and to invert fluids, particularly drilling muds, completion fluids and workover fluids including such esters.

Oil based fluids are known for use for drilling bores in rock, and are now often used in offshore drilling or in the penetration of water sensitive layers. Generally, they are used in the form of so-called invert emulsion muds which are based on an emulsion of an aqueous phase in a continuous oil phase. Commonly such emulsion drilling fluids also include solid(s) as weighting material. A wide range of further additives including emulsifier systems, fluid loss additives, alkali reserves, viscosity regulators and similar materials for stabilising the fluid and to give it desired performance properties, may also be included.

The first generation of oil based drilling fluids were based on hydrocarbon, often diesel, oil fractions often containing relatively high concentrations of aromatic constituents. Subsequently, to reduce toxicological and ecological problems from the aromatic hydrocarbons, 'aromatic free' hydrocarbon fractions were suggested. However, these did not reduce the problems as far as is desirable, particularly in marine, especially offshore, oil and gas drilling. Subsequently, naturally occurring triglyceride ester oils e.g. vegetable oils, and more recently or semisynthetic aliphatic esters have been proposed.

This invention is directed to the use of certain aromatic carboxylic acid esters, particularly hydrocarbyl, desirably alkyl or alkenyl, esters, having valuable properties, in drilling, completion and/or workover operations, particularly in oil and/or gas wells, or as components in drilling, completion and/or workover fluids. In particular these esters have a range of viscosities, especially extending to low viscosities, and toxicological and environmental profiles that can make them potentially very attractive as components of oil phase fluids for use in the drilling, completion and/or workover of wells, particularly oil and/or gas wells.

The present invention accordingly provides a method of drilling, completing or workover of a well, particularly a hydrocarbon, especially an oil or gas, well, in which a fluid is introduced into a well during the drilling, completing or workover operation on the well, in which the fluid includes a continuous phase, particularly as the continuous phase of a water in oil emulsion, including at least one compound of the formula (I):

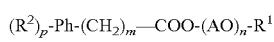

$(R^2)_p\text{-Ph-}(CH_2)_m\text{—COO-}(AO)_n\text{-}R^1$     (I)

where $R^1$ is a $C_1$ to $C_{20}$ hydrocarbyl group, particularly an alicyclic group, such as a $C_3$ to $C_{18}$ alkyl or alkenyl group;

AO is an alkyleneoxy group, particularly an ethyleneoxy or a propyleneoxy group, and may vary along the (poly)alkyleneoxy chain;

n is 0 or from 1 to 100, desirably 0;

m is 0, 1 or 2, desirably 0; and

Ph is a phenyl group, which may be substituted with groups $(R^2)_p$; where each $R^2$ is independently a $C_1$ to $C_4$ alkyl or alkoxy group;

and p is 0, 1 or 2.

The method of this invention is, in principle, applicable to drilling, completion and workover of wells in general, but will most usually be used when wells are drilled for access to fluid resources, in particular, water, but more usually hydrocarbons such as gas and, especially, oil. The invention accordingly specifically includes a method of the invention for the drilling, completion and workover of oil and/or gas wells.

The invention further includes a drilling, completion and/or workover fluid which is an emulsion of an aqueous phase, optionally including dissolved salts, in a continuous phase of an ester containing liquid including at least one compound of the formula (I) as defined above, optionally including a dispersion of weighting solids. The invention also includes a method of drilling completion and/or workover of the invention using such a drilling fluid.

In the compound(s) of the formula (I) used in the invention $R^1$ is desirably an alicyclic group, and particularly can be an alkyl or alkenyl group. Alkyl groups have the advantage that they are more stable, particularly to oxidation, than alkenyl groups, but alkenyl esters generally remain fluid at lower temperatures than alkyl esters, especially for longer chain materials. Desirably, an alkenyl group includes only a single double bond as multiple unsaturation generally gives poor stability. $R^1$ can be a relatively short chain e.g. a $C_3$ to $C_6$, alkyl group, and is desirably branched e.g. it is an iso-propyl (prop-2-yl), sec-butyl (but-2-yl), iso-butyl (2-methyl-prop1-yl) and/or tert-butyl group, to reduce the ease with which the ester can be hydrolysed. Such esters with secondary alcohols are particularly useful and $R^1$ is thus especially a $C_3$ to $C_5$ secondary alkyl group and very desirably an iso-propyl group. A benefit of such short chain esters is that they have low viscosity. However, the short chain esters have high solvent capacity and may interact with elastomeric well seals causing swelling which is undesirable. Longer chain esters may be used particularly as they are generally less active as solvents and thus have a lower tendency to swell elastomeric seals. Thus, $R^1$ can be a $C_6$ to $C_{20}$, particularly a $C_8$ to $C_{18}$ alkyl or alkenyl group which may be straight chain or branched e.g. as in 2-ethylhexyl or iso-nonyl or branched chain $C_{18}$ alkyl as in so-called iso-stearyl (actually a mixture of mainly branched $C_{14}$ to $C_{22}$ alkyl with an average chain length close to $C_{18}$). A particular unsaturated longer chain group is oleyl. Where longer chain length groups are used, particularly longer than $C_{12}$, it is desirable that they include branching and/or unsaturation as these promote liquid esters where straight chain saturated ester compounds may be solid and thus more difficult to use.

Although the carboxylic acid used in the ester can be a dihydrocinnamic acid or a phenylacetic acid, it is very desirably a benzoic acid i.e. desirably m is 0. Similarly, although the phenyl ring of the acid may be substituted, it is desirable that it is unsubstituted i.e. desirably p is 0. The esters used in the invention may include a (poly)alkyleneoxy chain, $(AO)_n$ in formula (I), between the carboxyl group and the group $R^1$. When present the (poly)alkyleneoxy chain is desirably a (poly)ethyleneoxy, a (poly)propyleneoxy chain or a chain including both ethyleneoxy and propyleneoxy residues. Generally, it is desirable not to include such a chain in the ester i.e. desirably n is 0.

Among the esters useful in this invention is iso-propyl benzoate which has a combination of properties that contribute to its usefulness: it has a wide liquid range (BP ca 219° C. and pour point <−60° C.); it is classified as non-flammable (flash point ca 99° C.) and under normal use conditions it has a low vapour pressure; it has a density similar to that of water (1.008 kg.l$^{-1}$ at 25° C.); and a low viscosity (2.32 cSt at 25° C.; measured by the U tube method, equivalent to 2.34 mPa.s).

To provide a balance of properties e.g. to have a fluid with a particular viscosity, mixed esters, having a variety of groups $R^1$, or blends of compounds of the formula (I), may be advantageous. Such mixed esters of blends can have the additional benefit that they are more liquid than pure, especially linear saturated compounds of similar overall $R^1$ carbon number. Particularly by using mixed esters including esters having a relatively large group $R^1$ with esters having a relatively small group $R^1$, the extent of adverse effects such as elastomer seal swelling for using the esters with good solvent properties can be substantially reduced, while retaining the benefits of low viscosity.

The continuous phase of the fluid used in this invention can be wholly of one or more compounds of the formula (I), or it may contain other components used in admixture. Although aromatic hydrocarbons can be included it is unlikely that they will be used as a major component of any such mixed carrier fluid, because of the adverse environmental impact. Mixtures with non-aromatic hydrocarbon liquids e.g. paraffinic fluids may be used, but these are relatively non-biodegradable so will generally not be preferred. Mixtures of compounds of the formula (I) with fluid esters such as fatty acid esters e.g. of $C_1$ to $C_{20}$ fatty acid $C_1$ to $C_{20}$ alkyl or alkenyl esters, can be used with advantage. In particular, as the fatty acid esters have moderately high viscosities e.g. iso-propyl oleate has a viscosity of ca 5.3 cSt at 40° C., the use of combinations of such esters with esters of the formula (I), particularly where $R^1$ is a $C_1$ to $C_6$, more particularly a $C_3$ to $C_5$ branched chain alkyl group and especially where the ester is or includes iso-propyl benzoate, can give mixtures with low viscosity.

When mixtures are used, compounds of the formula (I) will typically be present in at least 10%, usually at least 25%, more usually at least 40%, desirably at least 50%, by weight of the total fluid used. When present, other solvent components will desirably be used at level typically of from 1 to 90, usually 1 to 75%, more desirably 2 to 60, and particularly 5 to 50% by weight of the total carrier fluid used. Relatively low proportions of esters of the formula (I) can be usefully used to reduce the viscosity of conventional non-aqueous, especially organic ester, fluids. In particular where mixtures of esters of the formula (I) and fatty acid esters, particularly those described above, the weight ratio of ester of the formula (I) to fatty acid esters will usually be from 9:1 to 1:9, more usually from 8:2 to 2:8.

Where there are particular reasons for using esters having relatively small e.g. $C_1$ to $C_6$, especially $C_3$ to $C_5$ secondary alkyl groups, such as iso-propyl, groups, or mixtures including relatively high proportions of such esters e.g. to have a fluid with a particularly low viscosity, the potential for difficulties arising from interaction with conventional elastomeric seals may be overcome by using solvent resistant elastomeric well seals or by using metal well seals.

The compounds of the formula (I) are particularly useful as or as components of drilling fluids. Drilling fluids are used in wells being drilled, to transport drill cuttings to the surface, to suspend cuttings in the absence of circulation, to maintain bore hole stability, to cool and lubricate the drill bit and drill string and to control sub-surface pressure and prevent corrosion. Desirably also they do not damage rock formations, particularly by exposing the rock to aqueous media, that are or have been drilled through and have minimum environmental impact. Drilling and similar fluids incorporating esters of the formula (I) can meet these requirements and are thus particularly useful as drilling, completion and workover fluids. Accordingly the invention includes a method of drilling a well, particularly an oil well, in which the drilling fluid is or contains at least one compound of the formula (I) as defined above.

Drilling fluids are usually formulated to have a liquid and a solid phase. In this invention the liquid phase is or includes at least one compound of the formula (I) and may take the form of a homogeneous liquid or an emulsion, most usually an "invert" emulsion of an aqueous phase in the non-aqueous liquid phase. When present, the aqueous phase may contain salts, particularly inorganic salts, such as sodium chloride or calcium chloride up to saturation to increase the density of the fluid and/or alkali salts such as sodium hydroxide or sodium carbonate or lime to modify the pH of the system.

The solid phase typically includes weighting material such as finely ground high density water insoluble solids, particularly solids having a specific gravity at ambient temperature of greater than 2.5 particularly up to 6 and commonly from 4 to 5. Examples of weighting materials include barium sulphate (in this use commonly known as barite or barytes) (SG ca 4.5), iron oxide, ilmenite (iron titanium oxide), siderite (iron carbonate), galena (lead sulphide), or manganese tetraoxide, to increase the density of the fluid. Basic materials, such as calcium carbonate, dolomite (mixed calcium magnesium carbonate) or zinc oxide may be used as the, or included as a, solid to enable removal of solids by subsequent reaction with acid. Weighting solids typically have an average particle size in the range 20 to 200 mm. The amount used can vary widely so that the fluid density can be adjusted to provide the required hydrostatic pressure at the bottom of the well, in particular to prevent pressurised fluids (gasses or liquids) in strata through which the well is being drilled from flowing up the drilled well in an uncontrolled fashion. Typically amounts of weighting material used are in the range 0.2 to 2, more usually 0.25 to 1.5, kg.l$^{-1}$.

Solids such as clays, particularly montmorillonite, bentonite and/or attapulgite, may be added, usually at colloidal particle size, to modify the viscosity of the drilling fluid. Drilling fluids formulated with both liquid and solid phases are usually described as drilling muds. The invention further includes a drilling fluid which is a dispersion of weighting solids in an ester containing liquid phase which includes at least one compound of the formula (I) as defined above, and particularly where the liquid phase is an emulsion of an aqueous phase, which desirably includes dissolved inorganic salts, in a continuous phase of the ester containing liquid.

During active drilling, a significant proportion of the solids in circulating drilling fluid are those derived from the drilled formation. Large cuttings and pieces of drilled rock down to about 500 μm are typically removed from the drilling fluid using vibrating screens and/or sieves and finer solids by hydrocyclones and/or centrifuges, but very fine colloidal particles below one micron in size are retained within the circulating drilling fluid. Generally, the only means of removing these solids is eventually to dispose of the whole mud.

The invention accordingly includes a drilling fluid which is an emulsion of an aqueous phase including dissolved salts in a continuous phase of an ester containing liquid including at least one compound of the formula (I), the fluid further including a dispersion of weighting solids. The invention also includes a method of drilling of the invention using such a drilling fluid.

Drilling fluids incorporating esters of the formula (I) are particularly useful in demanding applications such as microhole drilling, slim hole drilling and coil tube drilling, because the low viscosity which can be obtained coupled with the lubricating effect of the oil enables good drilling operation. Accordingly, the invention specifically includes methods of micro-hole, slim hole and coil tube drilling using fluids containing compounds of the formula (I) as defined above.

Once a well, particularly an oil or gas well, has been drilled to a productive zone (production formation), a well casing is normally cemented in place to isolate and protect the rock formations through which the well passes. To provide communication between the production formation and well bore, the well casing is perforated at a level within the productive zone. This can be done by various methods such as jet perforation, bullet guns, hydraulic perforation, mechanical cutters and permeators. During such operations a formulated well completion fluid is generally used to minimise the damage to a potentially producing well. The main functions of a completion fluid are to carry solids, particularly weighting materials, used as in drilling fluids to provide hydrostatic pressure compensation, and to provide compatibility with the producing rock formation (reservoir rock) as most reservoir rocks are sensitive to any fluid other than that contained within them and completion fluids are generally formulated to minimise damage to the reservoir rock. Potentially, solids within the completion fluid can penetrate the reservoir rock and block flow passages in the formation and this harm may not be reparable subsequently and a recent trend is to use solid less completion fluids, at least for fluid in contact with the production zone.

The invention accordingly further includes a method of completing a well, particularly an oil and/or gas well which includes introducing into the well, in contact with or adjacent the production zone of the well a completion fluid which is an emulsion of an aqueous phase in an ester containing liquid phase which includes at least one compound of the formula (I) as defined above.

During the production life of a well, it is common practice to undertake remedial measures for example, extension of perforations, plugging old perforations and opening new perforations at a different level in the production formation. Generally, these operations are carried out with a workover fluid in the hole. The function of a workover fluid is somewhat different to that of a drilling fluid (mud) The primary function is to provide adequate hydrostatic head, and workover fluids may thus include weighting materials similar in type an amount to those used in drilling fluids, so that the workover operations can be carried out safely and without damaging the producing formation. Additionally, the workover fluid may be used to lift solids such as sand, silt and/or gravel from the bottom of the well to the surface. Oil based systems include an oil as the continuous phase and frequently include an aqueous discontinuous phase. As with completion fluids, there is potential for solids to penetrate and damage the reservoir rock and a recent trend is to use solid less workover fluids, at least for fluid in contact with the production zone.

The invention accordingly further includes a method of well workover, particularly on an oil and/or gas well which includes introducing into the well, in contact with or adjacent the production zone of the well a workover fluid which is an emulsion of an aqueous phase in an ester containing liquid phase which includes at least one compound of the formula (I) as defined above.

Particularly when solidless completion or workover fluids are used, especially in oil and/or gas wells, it will usually be desirable to have an overlying layer of a weighted well fluid to maintain adequate pressure at the production zone of the well e.g. to reduce the extent to which the oil and/or gas enters the well bore during completion or workover operations. Such fluids are typically referred to as completion or workover fluids although by including weighting, and usually, for oil based fluids, also salts dissolved in an emulsifed aqueous discontinuous phase, they are compositionally more similar to drilling fluids. The invention thus includes completion and workover methods in which the overlying fluid is a fluid of the invention, particularly having a composition as described generally for a drilling fluid of the invention.

Other components that may be included in drilling, completion and workover fluids of and used in this invention include:

fluid loss control chemicals—are commonly used in drilling, completion and workover fluids to reduce fluid loss. Fluid loss occurs when well fluids penetrate rock formations and particularly for completion and workover fluids it is desirable to minimise fluid loss to reduce or avoid the consequential damage to the production formation. Where solidless fluids are used, potentially the whole fluid can be lost into the formation. Loss control chemicals are materials that reduce the tendency of well fluids to be lost into rock formations and are typically hydrophilic polymers that increase the viscosity of the well fluid, particularly to give the fluid a pseudoplastic (shear thinning) Theological profile, to reduce the extent of fluid loss. Examples include carboxymethylcellulose and polyacrylonitrile, which are not acid soluble, xanthan gum which is typically about 50% acid soluble but biodegradable and hydroxyethyl cellulose and starch derivatives which are acid soluble. The advantage of acid soluble fluid loss control materials is that any such material that penetrates and potentially blocks the formation, can be removed by acid as in acidisation treatments. The proportion of fluid loss control chemicals used is typically from 0.1 to 2.5%, more usually from 0.8 to 2%, weight/volume of the fluid.

rheology modifiers (viscosifiers)—are commonly included in drilling, completion and workover fluids to increase the viscosity of the well fluid and examples include the materials described under loss control materials. As rheology modifiers hydroxyethyl cellulose is particularly useful in fluids containing substantial amounts of inorganic salts such as sodium chloride. The concentration of rheology modifiers used is typically from 0.1 to 1%, more usually from 0.3 to 1%, weight/volume of the fluid.

corrosion inhibitors—are commonly included in drilling, completion and workover fluids, because well fluids including salts e.g. brine solutions as in invert emulsion drilling muds, are corrosive to some extent towards metal components e.g. pipework, that they contact, and corrosion inhibitors act to reduce or eliminate corrosion. Commonly used corrosion inhibitors include film forming amines and low molecular weight inorganic compounds that contain a sulphur group. However, oil based well fluids, particularly drilling muds are usually have low corrosion rates, because the oil continuous phase coats the metal pipelines with a non-conductive fluid thereby limiting the rate-of corrosion. In addition, the oil phase of oil based fluids are generally free of bacteria (which often act to increase the rate of corrosion). The concentration of corrosion inhibitors used is typically from 0.1 to 1% by weight of the fluid.

acid soluble solids—when the well fluid includes solids i.e. it is not solidless, particularly for completion and workover fluids, the fluid density can be increased by acid soluble solids such as calcium carbonate, zinc oxide and similar materials. If a rock, particularly a production, formation is damaged by ingress of such solids, they may be removed by acid treatment as in acidisation of the well. The concentration of acid soluble solids used is typically from 0.3 to 3% by weight of the fluid.

The following Examples illustrate the invention. All parts and percentages are by weight unless otherwise stated.

| Materials | |
|---|---|
| Oil 1 | iso-propyl benzoate |
| Oil 2 | ethyl benzoate |
| Oil 3 | 2-ethylhexyl benzoate |
| Oil 4 | nonyl benzoate |
| Oil 5 | iso-stearyl* benzoate (*see description above) |
| Oil 6 | C 13/15 alcohol** benzoate (**commercial C13/C15 oxo alcohol) |
| Eoil 1 | 2-ethylhexyl oleate—an ester oil |
| Emul1 | Hypermer B261: water in oil emulsifier co(polyester polyether) surfactant ex Uniqema |
| Th1 | 2-hydroxyethyl cellulose |
| water | demineralised water |
| brine | synthetic sea water (to British Standards 3900 and 2001) |

EXAMPLE 1

An invert emulsion fluid was made up by mixing 27 parts by weight Oil 1 and 3 parts by weight Emul1 in a Hamilton beach blender under high shear. The aqueous phase, a solution of 15 parts by weight calcium chloride in 55 parts by weight water, was prepared and added dropwise to the oil/emulsifier blend under high shear mixing (using a Silverson mixer) to form a water in oil emulsion. The emulsion temperature was maintained below 55° C. using a (cold) water bath around the mixing vessel. Mixing was continued for 15 minutes after complete addition of the aqueous phase. The fresh emulsion, and samples of the emulsion stored at ambient temperature and 50° C. for 4 days and 12 days, remained stable and showed no signs of creaming or separation.

EXAMPLE 2

An invert emulsion completion or workover fluid was made up as described in Example 1 but changing the aqueous phase to a solution of 13.9 parts by weight calcium chloride, 51.1 parts by weight water and 5 parts by weight Th1. The fresh emulsion, and samples of the emulsion stored at ambient temperature and 50° C. for 4 days, remained stable and showed no signs of creaming or separation, after 12 days, the emulsion stored at ambient temperature showed 1% oil separation and that stored at 50° C. showed 2% oil separation.

EXAMPLE 3

An invert emulsion was made up as described in Example 1 using a 80/20 by weight blend of Oil 1 and Eoil 1 as the continuous phase. The product emulsion was stable, fresh and after storage at ambient temperature and 50° for 12 days.

EXAMPLE 4

An invert emulsion completion or workover fluid was made up as described in Example 2 using the 80/20 ester blend used in Example 3 as the continuous phase and an aqueous phase of a solution of 15 parts by weight calcium chloride, 53 parts by weight water and 2 parts by weight Th1. The emulsion was stable fresh and after storage for 4 days at ambient temperature and 50°, but showed some signs of instability after 12 days, although this was difficult to quantify because of air trapped in the emulsion.

EXAMPLE 5

An invert drilling fluid was made by mixing 200 parts by weight of the fluid of Example 1 with 50 parts by weight barium sulphate having an average particle size of ca 50 μm as a weighting material. The weighting material dispersed well in the fluid although the high proportion of weighting material made the fluid rather stiff.

EXAMPLE 6

Example 1 was repeated in several runs but substituting Oil 2, Oil 3, Oil 4, Oil 5 and Oil 6 for the Oil 1 used in Example 1. The emulsions were tested for stability as described in Example 1 and the results are set out in the table below (also including Example 1 results).

| | | Stability | | | |
|---|---|---|---|---|---|
| Ex No | Oil | 4 days amb | 12 days amb | 4 days 50° C. | 12 days 50° C. |
| 1 | Oil 1 | Stable | Stable | Stable | Stable |
| 6.1 | Oil 2 | Stable | Stable | Stable | Stable |
| 6.2 | Oil 3 | Stable | Stable | Stable | Stable |
| 6.3 | Oil 4 | Stable | Stable | Stable | Stable |
| 6.4 | Oil 5 | Stable | Stable | Stable | Stable |
| 6.5 | Oil 6 | Stable | <1% break | Stable | Stable |

EXAMPLE 7

Example 2 was repeated in a modified form using Oil 2, Oil 3, Oil 4, Oil 5 and Oil 6 instead of the Oil 1 used in Example 2 and in which the aqueous phase was a solution of 14.6 parts by weight calcium chloride, 53.4 parts by weight water and 2 parts by weight Th1 (using a reduced amount of thickener to avoid forming gels). The emulsions were tested for stability as described in Example 1 and the results are set out in the table below.

| | | Stability | | | |
|---|---|---|---|---|---|
| Ex No | Oil | 4 days amb | 12 days amb | 4 days 50° C. | 12 days 50° C. |
| 7.1 | Oil 2 | Stable | Stable | 2% break | 2% break |
| 7.2 | Oil 3 | Stable | 1% break | 4% break | 4% break |
| 7.3 | Oil 4 | Stable | Stable | <1% break | 1% break |
| 7.4 | Oil 5 | Stable | Stable | Stable | Stable |
| 7.5 | Oil 6 | Stable | Stable | Stable | <1% break |

EXAMPLE 8

Example 3 was repeated but substituting Oil 2, Oil 3, Oil 4, Oil 5 and Oil 6 instead of the Oil 1 in Example 3 in the 80/20 by weight blends with Eoil 1 as the continuous phase. The emulsions were tested for stability as described in Example 1 and the results are set out in the table below (also including Example 3 results).

| | | Stability | | | |
|---|---|---|---|---|---|
| Ex No | Oil | 4 days amb | 12 days amb | 4 days 50° C. | 12 days 50° C. |
| 3 | Oil 1 | Stable | Stable | Stable | Stable |
| 8.1 | Oil 2 | Stable | Stable | Stable | Stable |
| 8.2 | Oil 3 | Stable | Stable | Stable | Stable |
| 8.3 | Oil 4 | 3% break | 3% break | 1% break | 1% break |
| 8.4 | Oil 5 | Stable | Stable | Stable | <1% break |
| 8.5 | Oil 6 | Stable | Stable | Stable | Stable |

EXAMPLE 9

Example 4 was repeated but substituting Oil 2, Oil 3, Oil 4, Oil 5 and Oil 6 instead of the Oil 1 used in Example 4 in the 80/20 by weight blends with Eoil 1 as the continuous phase and 14.6 parts by weight calcium chloride, 53.4 parts by weight water and 2 parts by weight Th1 as the aqueous phase. The emulsions were tested for stability as described in Example 1 and the results are set out in the table below (also including Example 4 results).

| | | Stability | | | |
|---|---|---|---|---|---|
| Ex No | Oil | 4 days amb | 12 days amb | 4 days 50° C. | 12 days 50° C. |
| 4 | Oil 1 | Stable | <1% break | Stable | <1% break |
| 9.1 | Oil 2 | Stable (*<1%) | Stable (*<1%) | Stable (*<1%) | Stable (*2%) |
| 9.2 | Oil 3 | Stable | Stable | Stable | Stable (*1%) |
| 9.3 | Oil 4 | <1% break | <1% break | 2% break | 2% break |
| 9.4 | Oil 5 | Stable | Stable | Stable | Stable |
| 9.5 | Oil 6 | Stable | Stable | Stable | Stable |

*some of the thickener comes out of solution with approximate amount in %

EXAMPLE 10

Example 5 was repeated but substituting Oil 2, Oil 3, Oil 4, Oil 5 and Oil 6 instead of the Oil 1 in Example 5 to make the emulsions. 10 parts barium sulphate were added to 90 parts of each of the emulsions to form the weighted mud. The amount of barium sulphate used was reduced (10% instead of 20% based on the total mud) to give drilling muds of lower viscosity. These muds were tested for stability as described in Example 1 and the results are set out in the table below (also including Example 5 results).

| | | Stability | | | |
|---|---|---|---|---|---|
| Ex No | Oil | 4 days amb | 12 days amb | 4 days 50° C. | 12 days 50° C. |
| 5 | Oil 1 | Stable | Stable | Stable | Stable |
| 10.1 | Oil 2 | Stable | Stable | Stable | Stable |
| 10.2 | Oil 3 | Stable | Stable | Stable | Stable |
| 10.3 | Oil 4 | Stable | Stable | Stable | <1% break |
| 10.4 | Oil 5 | Stable | Stable | Stable | Stable |
| 10.5 | Oil 6 | Stable | Stable | Stable | Stable |

What is claimed is:

1. A method of drilling a well comprising:
   introducing into a well, during the drilling, a fluid comprising a continuous phase including at least one ester selected from iso-propyl benzoate, iso-stearyl benzoate, 2-ethylhexyl benzoate, iso-nonyl benzoate or oleyl benzoate.

2. The method of claim 1 wherein said continuous phase further comprises at least one compound represented by the following formula (I):

$$(R^2)_p\text{-Ph-}(CH_2)_m\text{—COO-}(AO)_n\text{-}R^1 \quad (I)$$

wherein $R^1$ is a $C_1$ to $C_{20}$ hydrocarbyl group;

AO is an alkyleneoxy group and may vary along the (poly)alkyleneoxy chain;

n 0 or from 1 to 100;

m is 0, 1 or 2; and

Ph is a phenyl group, which may be substituted with groups $(R^2)_p$; where each $R^2$ is independently a $C_1$ to $C_4$ alkyl or alkoxy group; and p is 0, 1 or 2.

3. A method as claimed in claim 2 wherein $R^1$ of formula (I) represents a $C_3$ to $C_{18}$ alkyl or alkenyl group.

4. A method as claimed in claim 2 wherein n, m and p of formula (I) each represent 0.

5. A method as claimed in claim 1, wherein the fluid includes at least 10% by weight of the total fluid of said ester.

6. A method as claimed in claim 2, wherein said continuous phase includes a blend of at least one compound of the formula (I) and at least one fatty acid ester.

7. A method as claimed in claim 1, wherein the well is an oil or gas well.

8. A method of drilling a well comprising:
   introducing into a well, during the drilling, a drilling fluid comprising an emulsion of an aqueous phase, including dissolved salts, in a continuous phase including at least one ester selected from iso-propyl benzoate, iso-stearyl benzoate, 2-ethylhexyl benzoate, iso-nonyl benzoate or oleyl benzoate;
   wherein said drilling fluid further includes a dispersion of weighting solids.

9. The method of claim 8 wherein said continuous phase further comprises at least one compound represented by the following formula (I):

$$(R^2)_p\text{-Ph-}(CH_2)_m\text{—COO-}(AO)_n\text{-}R^1 \quad (I)$$

wherein $R^1$ represents a $C_1$ to $C_{20}$ hydrocarbyl group;

AO independently represents an alkyleneoxy group;

n is 0 or from 1 to 100;

m is 0, 1 or 2;

Ph represents a phenyl group;

$R^2$ independently represents a $C_1$ to $C_4$ alkyl or alkoxy group; and p is 0, 1 or 2; and wherein said drilling fluid further includes a dispersion of weighting solids.

10. The method of claim 9 wherein $R^1$ of formula (I) represents a $C_3$ to $C_{18}$ alkyl or alkenyl group.

11. The method of claim 9 wherein n, m and p of formula (I) each represent 0.

12. The method of claim 8, wherein the fluid comprises at least 10% by weight relative to the total fluid of said ester.

13. The method of claim 9, wherein the continuous phase comprises a blend of at least one compound of the formula (I) and at least one fatty acid ester.

14. The method of claim 8, wherein the well is an oil and/or gas well.

15. The method of claim 8, wherein the well comprises oil and/or gas.

16. A drilling fluid for a well comprising: an emulsion of an aqueous phase in a continuous phase including at least one ester selected from iso-propyl benzoate, iso-stearyl benzoate, 2-ethylhexyl benzoate, iso-nonyl benzoate or oleyl benzoate.

17. The drilling fluid of claim 16 wherein said continuous phase further comprises at least one compound represented by the following formula (I):

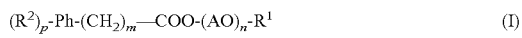

wherein $R^1$ represents a $C_1$ to $C_{20}$ hydrocarbyl group;

AO independently represents an alkyleneoxy group;

n 0 or from 1 to 100;

m is 0, 1 or 2;

Ph represents a phenyl group;

$R^2$ independently represents a $C_1$ to $C_4$ alkyl or alkoxy group; and p is 0, 1 or 2.

18. The drilling fluid of claim 17 wherein $R^1$ of formula (I) represents a $C_3$ to $C_{18}$ alkyl or alkenyl group.

19. The drilling fluid of claim 17 wherein n, m and p of formula (I) each represent 0.

20. The drilling fluid of claim 16, wherein the continuous phase includes at least one compound selected from iso-propyl benzoate, iso-stearyl benzoate and/or oleyl benzoate.

21. The drilling fluid of claim 16, wherein the drilling fluid comprises at least 10% by weight relative to the total drilling fluid of said ester.

22. The drilling fluid of claim 17, wherein the continuous phase comprises a blend of at least one compound of the formula (I) and at least one fatty acid ester.

23. The drilling fluid of claim 16, wherein the well is an oil and/or gas well.

24. The drilling fluid of claim 16, wherein the well comprises oil and/or gas.

25. A drilling fluid for a well comprising an emulsion of an aqueous phase including dissolved salts in a continuous phase including at least one ester selected from iso-propyl benzoate, iso-stearyl benzoate, 2-ethylhexyl benzoate, iso-nonyl benzoate or oleyl benzoate; and a dispersion of weighting solids.

26. The drilling fluid of claim 25 wherein said continuous phase further comprises at least one compound represented by the following formula (I):

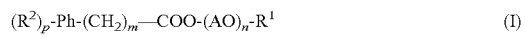

wherein $R^1$ represents a $C_1$ to $C_{20}$ hydrocarbyl group;

AO independently represents an alkyleneoxy group;

n 0 or from 1 to 100;

m is 0, 1 or 2;

Ph represents a phenyl group;

$R^2$ independently represents a $C_1$ to $C_4$ alkyl or alkoxy group;

p is 0, 1 or 2; and a dispersion of weighting solids.

27. The drilling fluid of claim 26 wherein $R^1$ of formula (I) represents a $C_3$ to $C_{18}$ alkyl or alkenyl group.

28. The drilling fluid of claim 26 wherein n, m and p of formula (I) each represent 0.

29. The drilling fluid of claim 25, wherein the drilling fluid comprises at least 10% by weight of the total drilling fluid of said ester.

30. The drilling fluid of claim 26, wherein the continuous phase comprises a blend of at least one compound of the formula (I) and at least one fatty acid ester.

31. The drilling fluid of claim 25, wherein the well is an oil or gas well.

32. The drilling fluid of claim 25, wherein the well comprises oil and/or gas.

33. A method of drilling a well comprising: introducing into a well, during the drilling, a fluid comprising a continuous phase including at least one compound selected from iso-propyl benzoate, iso-stearyl benzoate or oleyl benzoate.

34. A method of drilling a well comprising:

introducing into a well, during the drilling, a drilling fluid comprising an emulsion of an aqueous phase, including dissolved salts, in a continuous phase of an ester containing liquid comprising at least one compound selected from iso-propyl benzoate, iso-stearyl benzoate and/or oleyl benzoate, wherein said drilling fluid further includes a dispersion of weighting solids.

35. A drilling fluid comprising an emulsion of an aqueous phase including dissolved salts in a continuous phase of an ester containing liquid including at least one compound selected from iso-propyl benzoate, iso-stearyl benzoate and/or oleyl benzoate; and a dispersion of weighting solids.

* * * * *